US006975761B1

(12) United States Patent
Swann et al.

(10) Patent No.: US 6,975,761 B1
(45) Date of Patent: Dec. 13, 2005

(54) IMAGE PROCESSING FOR CLUSTERING RELATED TEXT OBJECTS

(75) Inventors: Robert Edward Meredith Swann, Cambridge (GB); Robert Wei Liang Tan, Herts (GB)

(73) Assignee: Consignia PLC, London (GB)

(*) Notice: Subject to any disclaimer, the term of this patent is extended or adjusted under 35 U.S.C. 154(b) by 507 days.

(21) Appl. No.: 09/724,182

(22) Filed: Nov. 28, 2000

(30) Foreign Application Priority Data

Jun. 30, 2000 (GB) .................................. 0016219

(51) Int. Cl.⁷ .............................. G06K 9/34; G06K 9/62
(52) U.S. Cl. ...................................... 382/173; 382/225
(58) Field of Search ................................ 382/101, 102, 382/173, 176, 181, 190, 218, 224, 225, 227, 162

(56) References Cited

U.S. PATENT DOCUMENTS

| | | | | |
|---|---|---|---|---|
| 5,809,167 A | * | 9/1998 | Al-Hussein | 382/190 |
| 5,818,978 A | * | 10/1998 | Al-Hussein | 382/296 |
| 5,883,973 A | * | 3/1999 | Pascovici et al. | 382/176 |
| 5,943,443 A | * | 8/1999 | Itonori et al. | 382/225 |
| 5,956,468 A | | 9/1999 | Ancin | 358/1.9 |
| 5,999,664 A | * | 12/1999 | Mahoney et al. | 382/305 |
| 6,064,769 A | * | 5/2000 | Nakao et al. | 382/224 |
| 6,327,384 B1 | * | 12/2001 | Hirao et al. | 382/173 |
| 6,562,077 B2 | * | 5/2003 | Bobrow et al. | 715/517 |

FOREIGN PATENT DOCUMENTS

EP     618 545 A2    3/1994    ............ G06K/9/26

OTHER PUBLICATIONS

International Search Report for PCT/GB01/02881 dated Oct. 10, 2001, 4 pages).
Whichello, A.P., et al: "*Fast location of address blocks and postcodes in mail–piece images*" Pattern Recognition Letters, North–Holland Publ., Amsterdam, NL, vol. 17, No. 11, Sep. 16, 1996, pp. 1199–1214.
Suen, H–M, et al: *Text String Extraction From Images of Colour–Printed Documents*, IEE Proceedings: Vision, Image and Signal Processing, Institution of Electrical Engineers, GB, vol. 143. No. 4, Aug. 1, 1996, pp. 210–216.
Yu, Z., et al: "*Locating Text in Complex Color Images*", Pattern Recognition, Pergamon Press, Inc., Elmsford, N.Y., vol. 28, No. 10, Oct. 1, 1995, pp. 1523–1535.

* cited by examiner

*Primary Examiner*—Andrew W. Johns
*Assistant Examiner*—Amir Alavi
(74) *Attorney, Agent, or Firm*—Flynn, Thiel, Boutell & Tanis, P.C.

(57) ABSTRACT

An image processor for producing clusters of related objects in a multi-level digital representation of an image includes a part for identifying predetermined objects in the image and for supplying data defining their locations. It also includes a part for deriving segmentation data directly from the multi-level digital representation. A segmentation device receives both sets of data and clusters the predetermined objects into groups for each segmented region before providing clustering data for subsequent analysis.

12 Claims, 5 Drawing Sheets

A) ORIGINAL DOCUMENT IMAGE
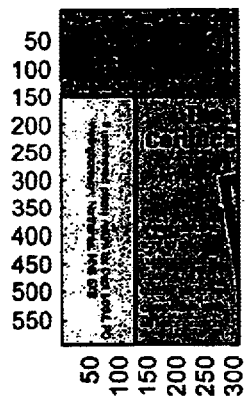
FIG. 3A
B) EXTRACTED BINARY TEXT OBJECTS
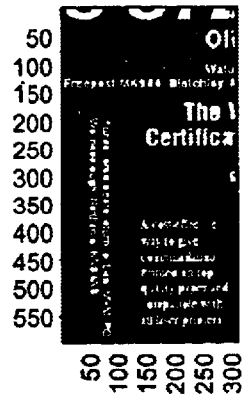
FIG. 3B
C) CLUSTERING USING SIMPLE MERGING. ALL TEXT OBJECTS ARE CLUSTERED TOGETHER
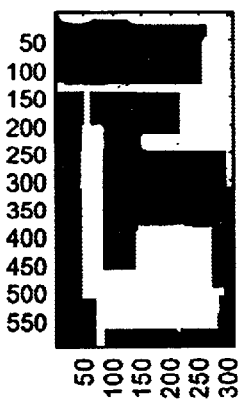
FIG. 3C
D) EXTRACT BACKGROUND FROM ORIGINAL
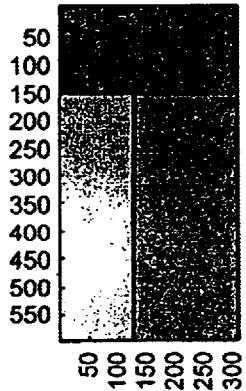
FIG. 3D
E) SEGMENT ACCORDING TO BACKGROUND. FOR EACH BACKGROUND REGION SEPARATELY APPLY MERGING TO THE TEXT OBJECTS
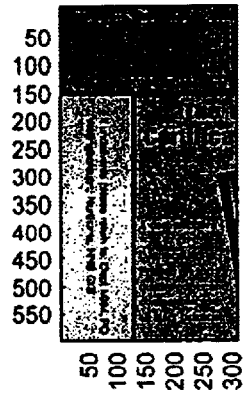 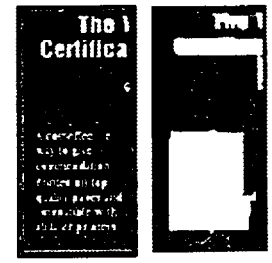
FIG. 3E
F) THE RESULTS ARE CLUSTERED TEXT OBJECTS THAT HAVE CONSISTENT BACKGROUND
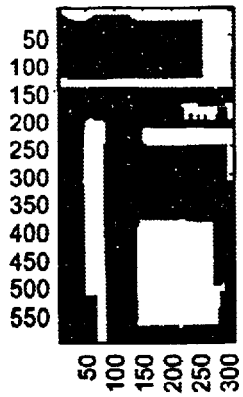
FIG. 3F

ORIGINAL
DOCUMENT IMAGE

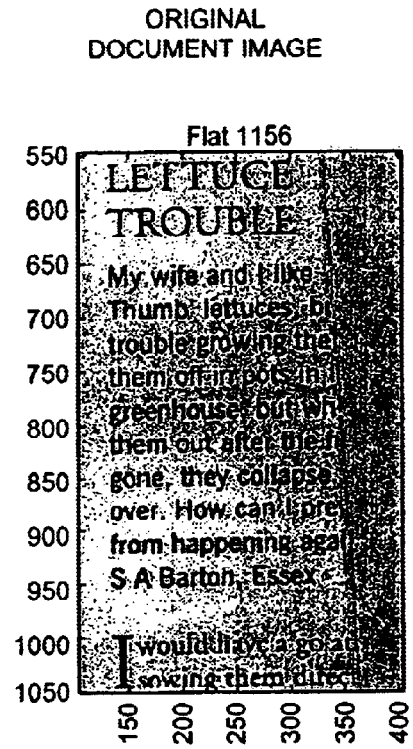

FIG. 4A

FOR EACH OF THE BINARY TEXT OBJECTS
EXTRACTED THE LOCAL MINIMUM GREYLEVEL
IS OBTAINED FROM THE ORIGINAL IMAGE.
THE LOCAL MINIMUM GREYLEVEL IS A
MEASURE OF THE TEXT COLOUR

MINIMUM GREY
LEVEL IMAGE

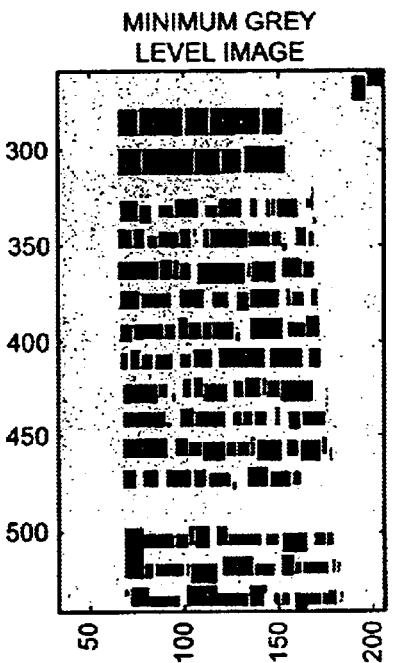

FIG. 4B

THE MINIMUM GREYLEVEL DATA IS USED TO
BUILD A SEGMENTATION OF THE IMAGE. EACH
REGION IN SEGMENTATION IS AN AREA OF
THE IMAGE WHERE THE TEXT COLOUR IS
CONSISTENT.

MERGED TEXT BLOCKS

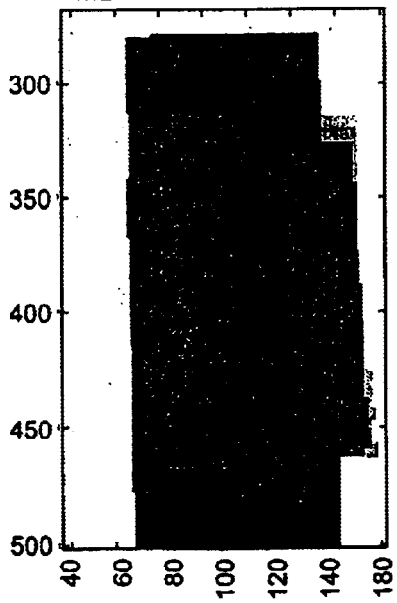

FIG. 4C

IMAGE PROCESSING FOR CLUSTERING RELATED TEXT OBJECTS

FIELD OF THE INVENTION

This invention relates to image processing and is of particular benefit in processing document images for purposes such as text identification. This type of process is particularly useful in address identification for automated reading of addresses in mail processing systems but is generally applicable to the text processing of document images.

BACKGROUND OF THE INVENTION

In processing a document image a common requirement is to isolate text objects and then cluster them into blocks of text (e.g. paragraphs, addresses, form fields etc). The first step is to extract the text objects resulting in a binary image. Clustering the binary text objects together then produces text blocks. A simple clustering technique would be to merge any neighbouring binary objects where the gap between the objects is less than a given limit. In documents where the blocks of text of interest are well separated from other text blocks, this technique is usually successfully. For example, for a simple white envelope with an address and a single stamp or indicia, the distance between letters in the address is usually significantly less than the distance between the address and the other objects on the envelope. Thus it is easy to set a distance limit in the merging that will cluster together the text objects of the address but not connect the address to the stamp or indicia which is significantly further away. However, on more complex document images, text block identification is not so simple. For example, many mail items have additional text and designs printed on them. Also, some mail items come in transparent packaging which allows the content to be seen from the outside. It is a more difficult task to identify likely candidates for an address from images of these types of documents.

Complex document images often require different processing to the more simple images to identify and read, e.g. address information. Accordingly in the case of processing mail we have proposed in our British Patent Application No. [------] filed on the same day as the current application, a method and apparatus for identifying the degree of complexity in an image of a mail item, so that subsequent processing is appropriate to the image.

The merging of binary text objects from a document image connects together text objects that have a gap between them that is less than a distance limit. The merging distance limit needs to be appropriate to the text. If the distance limit is too small then some text within a block remains un-merged and isolated. If the distance limit is too large then over-merging occurs where distinct text blocks are incorrectly linked. The appropriate merging distance limit is usually proportional to the font size of the text in the document being processed. In simple documents where the text block of interest is well separated from other objects in the image the setting of the merging distance limit is easy. However, in complex image documents there may be text objects of a variety of fonts, sizes and orientations. With such images the clustering of text objects may not be possible with a single merging distance limit, since a limit which is too small for some text objects in the document may be too large for text in another part of the image. In such situations the clustering of text objects into text blocks usually becomes more complex as techniques should connect together only text of the same font, orientation, etc.

We have appreciated that the process of clustering related text objects can be made more computationally efficient and successful by approaching it as a segmentation problem followed by a simple merging routine, rather than investing in a complicated or computationally expensive clustering technique. Accordingly, a preferred embodiment of the present invention first segments the binary image of the text objects in such a way as to separate text objects that are close but unrelated. This effectively separates the complex image into separate simple images where a coarse computationally light merge can be applied to successfully cluster the text objects into relevant text blocks. In a preferred embodiment of the invention, the information used to segment the binary text objects is taken from the original greyscale or colour document image. Items of different greyscale or colour value are assumed to be unrelated. Items on different greyscale or colour value are assumed to be unrelated.

There are a number of local text attributes that generally remain constant for a text block in a document image. The useful measures that could be extracted from the binary text objects such as font, orientation and alignment are usually computationally demanding to calculate. The local text attribute used in this preferred embodiment is a local measure of the text's original colour or greyscale value. This is computationally easy to measure but requires the interrogation of the original image. This is different to most document image processing techniques, which discard the original image information once the binary text objects have been extracted. In addition this invention also uses a global document image attribute to separate unrelated text blocks. This is the background colour in the document, which again in standard techniques would have been lost in discarding the original image. These measures are useful as long as the assumptions that text blocks are printed in a consistent colour and on a consistent background hold for the document image being processed.

The invention is defined with more precision in the appended claims to which reference should now be made.

BRIEF DESCRIPTION OF THE DRAWINGS

A preferred embodiment of the invention will now be described in detail by way of example with reference to the accompanying drawings in which:

FIGS. 3A, 3B, 3C, 3D, 3E and 3F show schematically how segmentation from global background information is used to assist in the creation of clusters of related text objects;

FIGS. 4A, 4B and 4C show schematically how segmentation from local minimum greyscale information is used to assist in the creation of clusters of related text objects.

DETAILED DESCRIPTION

In the processing of document images the first stage is to acquire the image. This image acquisition may be through the use of a scanner camera or other interface. In the example of a mail processing system the resultant document image is a 256 level greyscale image. Embodiments of the invention may be designed for original document images that are greyscale or colour, but not simple binary images.

Figure 1:
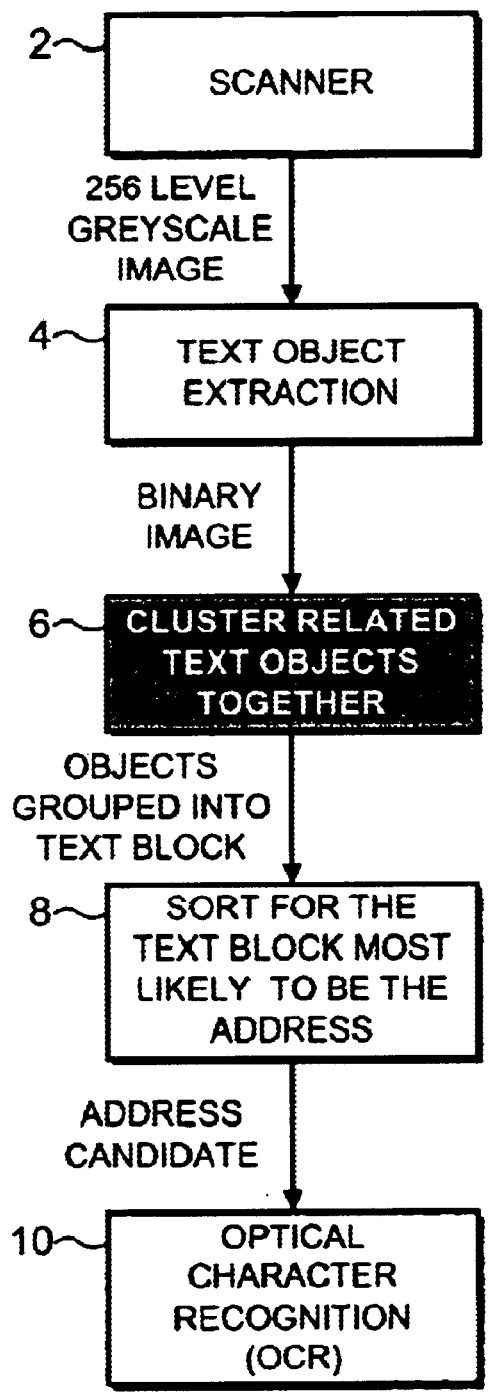
FIG. 1 shows schematically apparatus for identifying addresses on envelopes.

In the example of a mail processing system, the stages of identifying addresses on envelopes, as will be used in an embodiment of the invention, are shown in FIG. 1. A scanner 2 produces a 256 level greyscale image in which each picture element (pixel) has assigned to it a 256 level greyscale value representing the darkness of the image at that pixel. A text object extraction unit 4 then produces a binary image of text objects within the image. The text object extraction unit operates according to one of a number of methods of operation which will be familiar to those skilled in the art. This binary data defines the size and location of all objects that may be letters and passes it to a clustering unit 6. This creates blocks of related text objects which are passed to a sorting unit 8 which orders the text blocks according to their properties (e.g., number of lines, number of letters, location on the envelope). This sorts the text blocks in order of decreasing likeliness of being an address and then sends these in turn to an optical character recognition device (OCR) which can read the text blocks.

With simple white envelopes the clustering unit in the mail processing system can be a merger routine which removes spaces smaller than a predetermined size between the text objects. Thus, where the objects are letters it should merge them into paragraphs. In the case of simple white envelopes the determining of the merger distance limit is easy because the text blocks are well separated. In more complex documents it is not always possible for a single merger distance limit to successfully cluster all the text blocks without also over-merging some of the data (i.e. connecting some unrelated text blocks).

Embodiments of the invention cluster together related text objects into paragraphs in cases where a simple merger is not sufficient. The embodiment, shown in FIG. 2, uses a text object extraction unit 4 as before to extract the binary text data. However the original image provided by the scanner is also retained and used to provide two different segmentations of the image.

The first segmentation is performed by a local information segmentation unit 12. This receives data from the text object extraction unit indicating which objects are text in the image and also receives data from the original greyscale/colour image to give a measure of the text greyscale or colour for each item of text. Once the greyscale/colour has been calculated for all the text objects, a segmentation of the image is created from the data. For example, in a mail processing system a measure of a minimum grey level of the letters is used as the local measure of text colour. The segmentation created by the local information segmentation unit 12 segments blocks of text of similar colour together. Thus, if items of text are within the normal merging limit of the clustering system but are of different greyscale or colour values, they will fall into different text blocks and cannot subsequently be merged.

The second segmentation is a global information segmentation unit 14. This performs a segmentation based on the global information in the background of the original image. The unit generates a background image from the original greyscale/colour image and looks for differences in background colour/greyscale to perform segmentations between areas of different background greyscale/colour.

Data from the text object extraction unit 4, the local information segmentation unit 12, and the global information segmentation unit 14 are then provided to a master segmentation unit 16. This applies the segmentation information provided by the local and global segmentation units to the binary image of the text objects. Thus, the text objects of a single complex image are converted to the text objects of a plurality of simpler segmented regions. Each of these regions contains text objects where the background and text greyscale/colour are constant. The data for each region is then supplied in turn to a merging unit 18 which merges text objects for each region into clusters of related text objects. This results in groups of text blocks. From here they can be provided to the sorting unit 8 of FIG. 1 and subsequently to the optical character recognition unit 10. This enables the most likely candidates for the address on the envelope to be identified and read.

Figure 2:
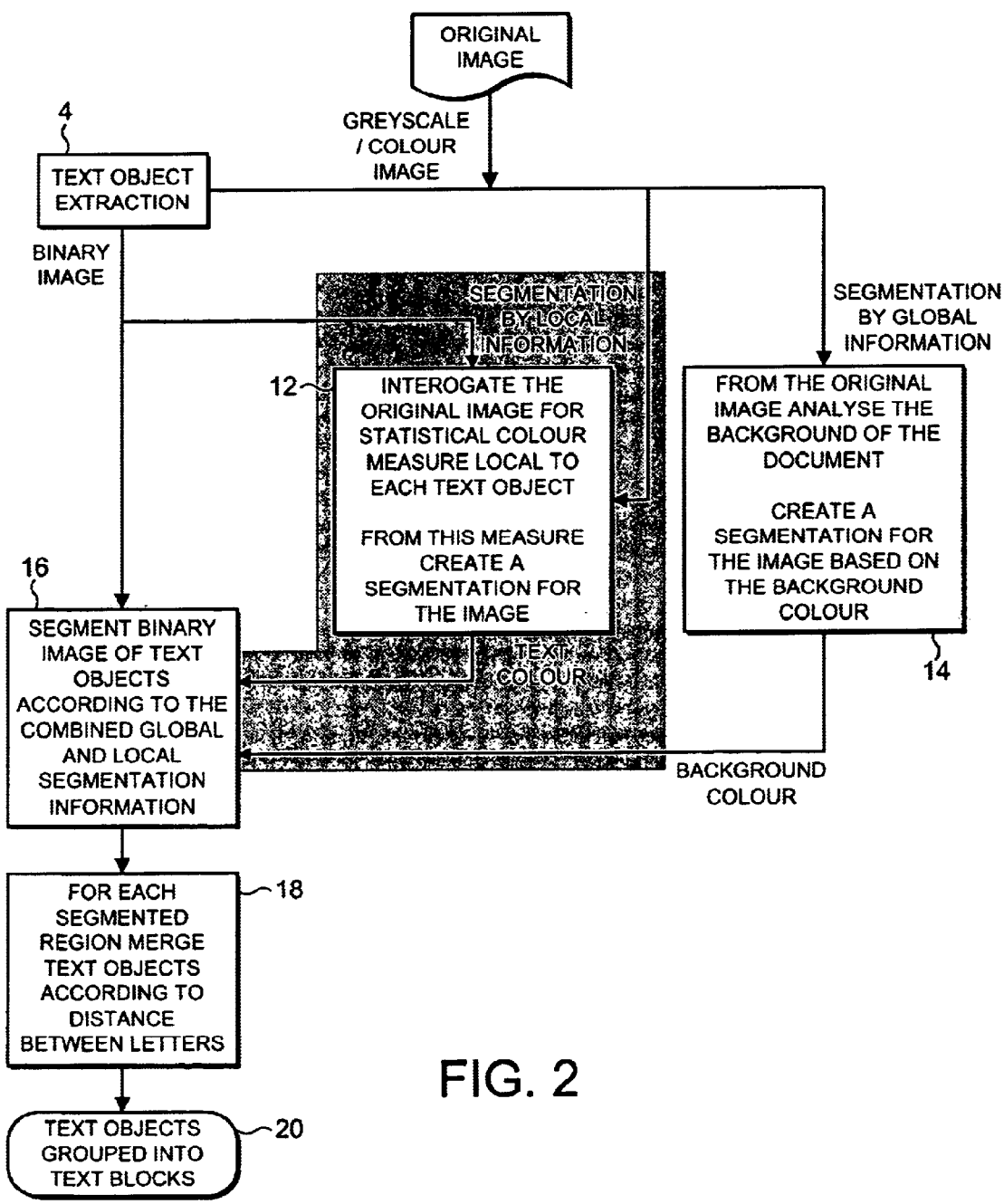
FIG. 2 shows schematically an embodiment of the invention for isolating text blocks in a document image.

FIG. 3a)–f) shows diagrammatically how text objects in a document which would normally be clustered together using a simple merger unit are correctly clustered into related text blocks when each segmented background region is processed separately using apparatus from that of FIG. 2. FIG. 3a) shows the original document image and FIG. 3b) the binary image produced by the text object extraction unit 4. FIG. 3c) shows the results of clustering which would be produced by the arrangement of FIG. 1. FIG. 3d), however, shows the data which would be extracted by the global information segmentation unit 14 of FIG. 2. In this the background regions are clearly identified. FIG. 3e) then shows how the segmentation unit 16 segments the image according to the different background regions and how one of those regions then has its text objects merged by the merging unit 18. FIG. 3f) shows the results and clusters of text objects which have consistent backgrounds which can then subsequently be sorted to determine the most likely candidates for address blocks.

In FIG. 4, the use of the minimum grey level as a local text colour measurement as performed by the local information segmentation unit 12 is shown. The original document image is shown in FIG. 4a). In FIG. 4b) the binary image produced by text object extraction unit 4 and the original document image are combined and the minimum grey level for each text object is obtained from the original document image. The local minimum grey level is a measure of text colour or darkness. Thus, it can be seen that there are several different grey levels in FIG. 4b).

The segmentation then produced by local information segmentation unit 12 is shown in FIG. 4c) where the image is divided into a number of regions, each of which have the same text colour or greyscale. This information is fed into the segmentation unit 16 for use in providing the overall segmentation which is input to the merging unit 18.

Figure 5:
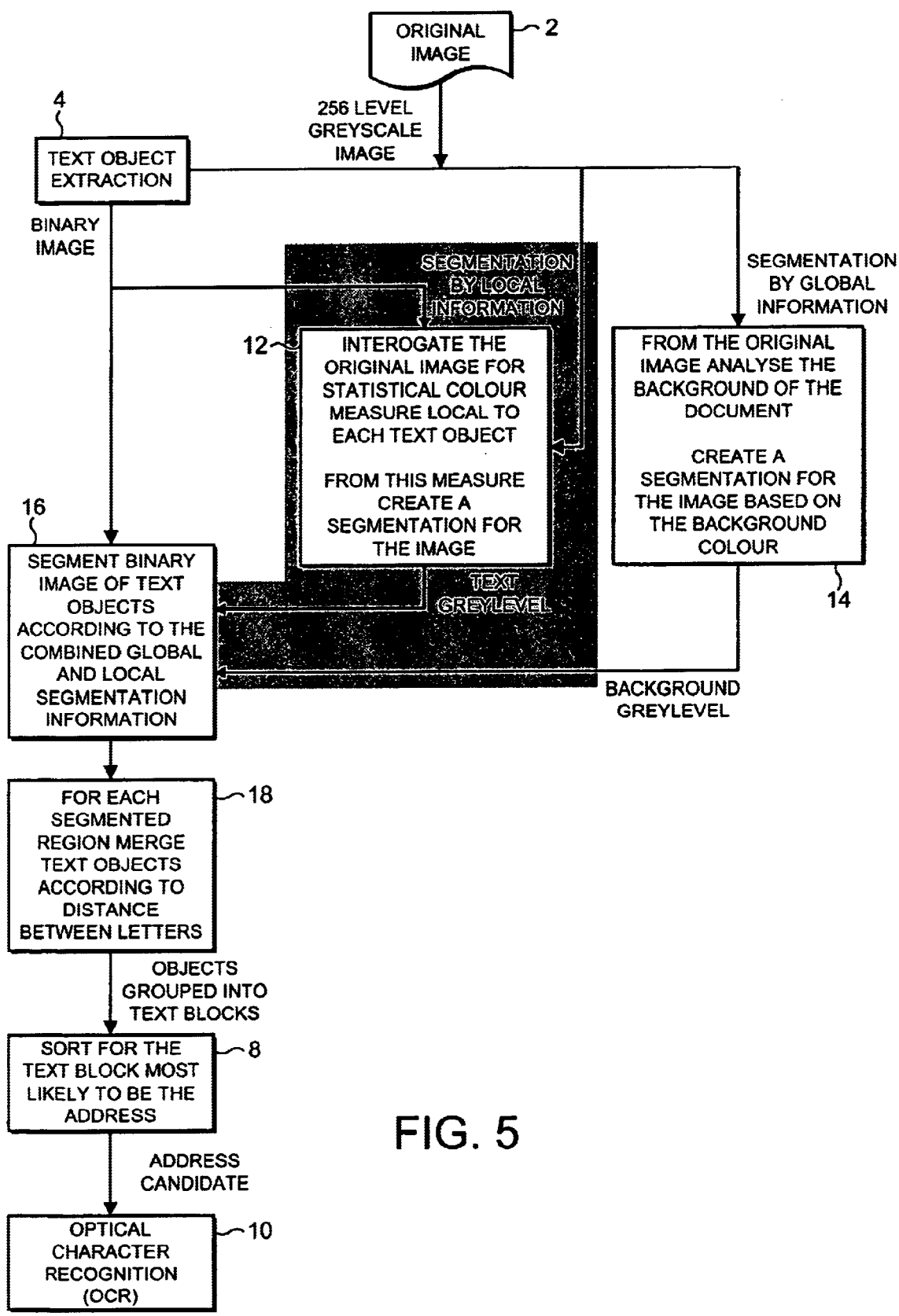
FIG. 5 shows schematically an embodiment of the invention being used in the example of identifying addresses on complex envelopes.

FIG. 5 shows an application embodying the invention of FIG. 2 in which the sorting unit 8 and optical character recognition unit 10 are shown receiving the output from the merging unit 18. In this particular example, the scanner 2 produces a 256 level greyscale image. Clearly, it could also produce a colour image. Other than this, the apparatus operates in the same manner as that of FIG. 2. As a mail processing system, it is able to deal with document images of more complex envelopes than has previously been the case.

What is claimed is:

1. An image processing system for producing clusters of related objects for subsequent analysis comprising, means for supplying a multi-level digital representation of the image, means for identifying predetermined objects in the image and supplying data defining their locations, means for deriving segmentation data from the multi-level digital representation wherein the means for deriving the segmentation data from the multi-level representation comprises means for comparing differences in background data to derive the segmentation data, means for combining the data defining the locations of objects with said segmentation data, means for clustering the predetermined objects into groups for each segmented region and means for supplying data relating to the groups for subsequent analysis.

2. An image processing system according to claim 1 in which the objects are text objects.

3. An image processing system according to claim 1 in which the background data comprises colour data.

4. An image processing system according to claim 1 in which the background data comprises greyscale data.

5. An image processing system for producing clusters of related objects for subsequent analysis comprising, means for supplying a multi-level digital representation of the image, means for identifying predetermined objects in the image and supplying data defining their locations, first segmentation means for deriving segmentation data from the multi-level digital representation, second segmentation means receiving the multi-level digital representation of the image and the data identifying the locations of the objects in the image for deriving segmentation data relating to differences in the data of the multi-level digital representation from the said objects, means for combining the data defining the locations of objects with said segmentation data, wherein the combining means receives the segmentation data and further segments the data defining locations of the object image in dependence on this segmentation data, and means for clustering the predetermined objects into groups for each segmented region and means supplying data relating to the groups for subsequent analysis.

6. An image processing system according to claim 5, in which the second segmentation means derives the segmentation data thereof from the colour of the objects.

7. An image processing system according to claim 5, in which the second segmentation means derives the segmentation data thereof from the greyscale level of the objects.

8. A method for processing images to produce clusters of related objects for subsequent analysis comprising the steps of supplying a multi-level digital representation of the image, identifying predetermined objects in the image, supplying data defining the locations of these predetermined objects, deriving segmentation data for the image from the multi-level digital representation which step further comprises comparing differences in background data to determine the segmentation data, combining the data defining the locations of the objects with the segmentation data, clustering the objects into groups for each segmented region, and supplying data relating to the groups for subsequent analysis.

9. A method according to claim 8, in which the objects are text objects.

10. A method according to claim 8 in which the background data comprises colour data.

11. A method according to claim 8 in which the background data comprises greyscale data.

12. A method for processing images to produce clusters of related objects for subsequent analysis comprising the steps of supplying a multi-level digital representation of the image, identifying predetermined objects in the image, supplying data defining the locations of these predetermined objects, deriving segmentation data for the image from the multi-level digital representation, receiving the multi-level digital representation of the image and the data identifying the location of the objects in the image and deriving additional segmentation data relating to differences in the data of the multi-level representation for said objects, combining the data defining the locations of the objects with the segmentation data, wherein the combining step further segments the data defining the locations of objects in dependence on the additional segmentation data and clustering the objects into groups for each segmented region, and supplying data relating to the groups for subsequent analysis.

* * * * *